No. 608,905. Patented Aug. 9, 1898.
W. L. PILKINGTON.
PRODUCTION OF CORRUGATED SHEET GLASS AND APPARATUS THEREFOR.
(Application filed Aug. 27, 1895.)
(No Model.)

Witnesses
John Harold Dickinson

Inventor
William Lee Pilkington

THE NORRIS PETERS CO., PHOTO-LITHO., WASHINGTON, D. C.

United States Patent Office.

WILLIAM LEE PILKINGTON, OF ST. HELEN'S, ENGLAND.

PRODUCTION OF CORRUGATED SHEET-GLASS AND APPARATUS THEREFOR.

SPECIFICATION forming part of Letters Patent No. 608,905, dated August 9, 1898.

Application filed August 27, 1895. Serial No. 560,655. (No model.) Patented in England August 20, 1894, No. 15,792; in France March 18, 1895, No. 245,884, and in Belgium March 19, 1895, No. 114,683.

*To all whom it may concern:*

Be it known that I, WILLIAM LEE PILKINGTON, a subject of the Queen of Great Britain, residing at St. Helen's, in the county of Lancaster, England, have invented certain new and useful Improvements in the Production of Corrugated Sheet-Glass and in Apparatus Employed Therein, (for which I have obtained Letters Patent in Great Britain, No. 15,792, dated August 20, 1894; in France, No. 245,884, dated March 18, 1895, and in Belgium, No. 114,683, dated March 19, 1895;) and I do hereby declare that the following is a full, clear, and exact description of the invention, which will enable others skilled in the art to which it appertains to make and use the same.

The objects of the invention are by a new system of manipulation, with the aid of novel apparatus or tools, to produce corrugated sheet-glass of equal strength and thickness throughout in an inexpensive, expeditious, and simple manner.

To carry my invention into effect, I take sheet-glass obtained in any usual or suitable way of the required thickness and size and at a temperature sufficiently high to permit the said glass to be freely worked. The necessary temperature is secured by reheating or by treating the glass while it is being or immediately after it has been opened. I then work the glass into shape by a successive or step-by-step formation of corrugations instead of forming all the corrugations at once, so that the glass obtains the corrugated form without being stretched or reduced in thickness in parts and becomes narrower or of less breadth as each corrugation is formed instead of remaining the same width as the original sheet. After being corrugated the glass is annealed in any suitable way.

To enable my process to be carried into effect, I have devised the following novel apparatus or tools.

Figure 1:
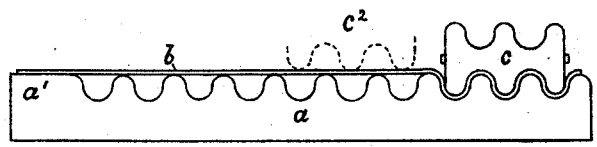
Figure 2:
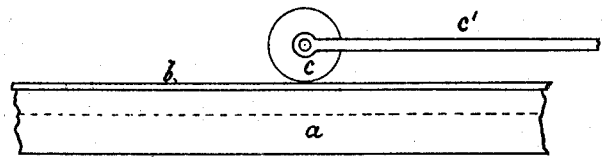
Figure 3:
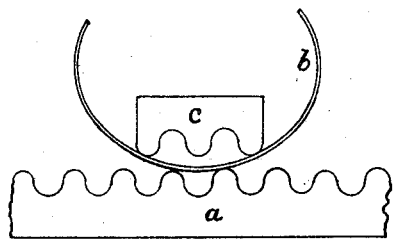

Figure 1 is a front elevation. Fig. 2 is a side elevation showing a corrugated table on which the glass is spread and a corrugated roller for forming the successive corrugations, and Fig. 3 is a front elevation showing a modified form.

$a$ is the table, which may be made with a flat side $a'$ or may have the corrugations carried all along its width.

$b$ is the heated sheet-glass to be corrugated.

$c$ is a corrugated roller, which, in conjunction with the table, forms the corrugations in the glass. The said roller should not have more than three projections, so that when it is first placed on the glass, as shown at $c$, the sheet can draw down at both sides into the hollow portions of the corrugations of the table. The corrugating is obtained by moving the roller back and forth over the table by means of the handle $c'$. When the first three corrugations have been formed, the roller is moved sidewise, so as to form successively a fourth, fifth, and sixth corrugation when it is in the position shown by the dotted lines $c^2$. The operation is continued until the end of the table is reached, when the glass on the flat portion $a'$ will all have been drawn into the corrugations. A corrugated block might be used instead of a roller.

When a sheet of glass is being corrugated while it is being opened from the cylinder, the corrugating block or roller would first act in the center and be moved along so as to corrugate first one side of the sheet and then the second side of the sheet, as shown in Fig. 3, which is a front elevation showing a sheet-glass cylinder being opened on a corrugating-table $a$ and also the position of the corrugating block or roller $c$ at the commencement of the corrugating operation. It will be noticed that the hollows in the table and block or roller have a greater diameter than the projections, so as to allow space for the glass between.

The roller or block may be suspended in movable bearings and the table may be movable sidewise or back or forth, so as to facilitate manipulation.

I claim—

1. The method of corrugating sheet-glass, consisting in laying a heated sheet of glass upon a corrugated die or table, forcing a portion of the sheet into some of the corrugations in the die or table, and successively drawing the free portion of the sheet into the remaining corrugations one at a time in a step-by-step manner; substantially as described.

2. The method of corrugating sheet-glass, consisting of laying a sheet of heated glass upon a corrugated die or table, forcing a portion of the sheet into some of the corrugations of the die or table by acting upon the glass successively along the length of the corrugations, and successively drawing the free portion of the sheet into the other corrugations one at a time by successive action along the length of each corrugation; substantially as described.

3. In apparatus for corrugating sheet-glass, the combination with a corrugated table, of a corrugated presser of much less width than the table, this presser being also much shorter than the length of the corrugations and being arranged to act upon the successive portions of the glass along the length of the corrugations; substantially as described.

4. In apparatus for corrugating sheet-glass, the combination with a corrugated table, of a corrugated presser of much less width than the table, the hollows of the corrugations being wider than the projections so as to leave a space between them for the glass; substantially as described.

In testimony whereof I have hereunto set my hand this 16th day of August, 1895.

WILLIAM LEE PILKINGTON.

Witnesses:
JOHN HAROLD DICKINSON,
WILLIAM HENRY LACHLAND.